United States Patent
Barbieri et al.

(10) Patent No.: US 9,288,004 B2
(45) Date of Patent: *Mar. 15, 2016

(54) SEMI-PERSISTENT SCHEDULING GRANTS IN HETEROGENEOUS NETWORKS

(71) Applicant: QUALCOMM Incorporated, San Diego, CA (US)

(72) Inventors: Alan Barbieri, San Diego, CA (US); Hao Xu, San Diego, CA (US); Madhavan Srinivasan Vajapeyam, San Diego, CA (US); Aleksandar Damnjanovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/974,954

(22) Filed: Aug. 23, 2013

(65) Prior Publication Data

US 2013/0343355 A1    Dec. 26, 2013

Related U.S. Application Data

(63) Continuation of application No. 13/087,170, filed on Apr. 14, 2011, now Pat. No. 8,634,364.

(60) Provisional application No. 61/326,193, filed on Apr. 20, 2010.

(51) Int. Cl.
*H04W 4/00* (2009.01)
*H04J 3/16* (2006.01)
(Continued)

(52) U.S. Cl.
CPC ............. *H04J 3/1694* (2013.01); *H04W 16/14* (2013.01); *H04W 72/042* (2013.01); *H04L 1/0025* (2013.01); *H04W 84/045* (2013.01)

(58) Field of Classification Search
CPC . H04J 3/1694; H04W 72/04; H04W 72/0406; H04W 72/042; H04W 72/044; H04W 72/0446; H04W 72/12; H04W 16/02; H04W 16/04; H04W 16/06; H04W 16/10; H04W 16/14; H04W 84/045; H04L 1/0025
See application file for complete search history.

(56) References Cited

U.S. PATENT DOCUMENTS 8,260,356 B2    9/2012   Nam et al.
8,285,298 B2   10/2012   Noriega et al.
(Continued)

FOREIGN PATENT DOCUMENTS

CA    2725426 A1    10/2009
CA    2725463 A1    10/2009
(Continued)

OTHER PUBLICATIONS

European Search Report—EP13169905—Search Authority—The Hague—Jul. 10, 2014.
(Continued)

*Primary Examiner* — Kevin Mew
(74) *Attorney, Agent, or Firm* — Nerrie M. Zohn

(57) ABSTRACT

Time division multiplexing (TDM) partitioning is one of the inter-cell interference coordination (ICIC) mechanisms considered for a heterogeneous network (HetNet) ICIC in a co-channel deployment. For example, in subframes that are pre-allocated to an evolved Node B (eNB), neighbor eNBs may not transmit, hence interference experienced by served user equipments (UEs) may be reduced. Semi-persistent scheduling (SPS) grants may have various available periodicities, which may not be compatible with TDM partitioning. Therefore, a UE may miss an SPS opportunity that was scheduled for a subframe that was not usable by the UE. Hence, using SPS grants with small periodicities in a heterogeneous network with TDM partitioning may require changes which may include adjusting the periodicities of the SPS grants, rescheduling of uplink SPS messages based on resource partitioning information (RPI), and/or determining RPI based on current SPS grants.

40 Claims, 16 Drawing Sheets

(51) Int. Cl.
*H04W 72/04* (2009.01)
*H04W 16/14* (2009.01)
*H04W 84/04* (2009.01)
*H04L 1/00* (2006.01)

(56) References Cited

U.S. PATENT DOCUMENTS

| | | | |
|---|---|---|---|
| 8,315,217 | B2 | 11/2012 | Montojo et al. |
| 8,488,567 | B2 | 7/2013 | Papasakellariou et al. |
| 8,527,829 | B2 * | 9/2013 | Fong et al. .................... 714/749 |
| 8,582,429 | B2 * | 11/2013 | Wang ................ H04W 72/042 370/230 |
| 2007/0242636 | A1 * | 10/2007 | Kashima et al. ............. 370/329 |
| 2008/0225783 | A1 * | 9/2008 | Wang et al. ................... 370/329 |
| 2009/0103500 | A1 | 4/2009 | Malkamaki et al. |
| 2009/0245194 | A1 * | 10/2009 | Damnjanovic ........ H04L 1/1607 370/329 |
| 2010/0008282 | A1 | 1/2010 | Bhattad et al. |
| 2010/0054203 | A1 * | 3/2010 | Damnjanovic et al. ....... 370/329 |
| 2010/0323709 | A1 * | 12/2010 | Nam ..................... H04B 7/043 455/450 |
| 2011/0039568 | A1 * | 2/2011 | Zhang ................ H04W 74/002 455/452.1 |
| 2011/0064037 | A1 * | 3/2011 | Wei ...................... H04L 5/0035 370/329 |
| 2011/0085503 | A1 * | 4/2011 | Nam .................. H04W 72/042 370/329 |
| 2011/0116463 | A1 | 5/2011 | Ishii et al. |
| 2011/0235602 | A1 * | 9/2011 | Ji .......................... H04L 5/0007 370/329 |
| 2011/0243012 | A1 | 10/2011 | Luo et al. |
| 2011/0243066 | A1 | 10/2011 | Nayeb et al. |
| 2011/0274040 | A1 | 11/2011 | Pani et al. |
| 2011/0286407 | A1 * | 11/2011 | Vajapeyam et al. ........... 370/329 |
| 2012/0082101 | A1 | 4/2012 | Gaal et al. |
| 2012/0093096 | A1 | 4/2012 | Barbieri et al. |
| 2012/0190391 | A1 | 7/2012 | Yoo et al. |
| 2012/0307733 | A1 | 12/2012 | Kim |
| 2013/0265970 | A1 | 10/2013 | Papasakellariou et al. |

FOREIGN PATENT DOCUMENTS

| | | |
|---|---|---|
| EP | 2112845 A1 | 10/2009 |
| EP | 2166809 A1 | 3/2010 |
| EP | 2166811 A2 | 3/2010 |
| JP | 2007214823 A | 8/2007 |
| JP | 2010011442 A | 1/2010 |
| JP | 2010011443 A | 1/2010 |
| JP | 2010232742 A | 10/2010 |
| JP | 2011529309 A | 12/2011 |
| WO | 2009120934 A1 | 10/2009 |
| WO | 2009129897 A1 | 10/2009 |
| WO | WO-2009131154 A1 | 10/2009 |
| WO | 2009158546 A1 | 12/2009 |
| WO | WO-2010015167 A1 | 2/2010 |
| WO | WO-2010018819 A1 | 2/2010 |

OTHER PUBLICATIONS

International Preliminary Report on Patentability—PCT/US2011/033310—The International Bureau of WIPO Geneva, Switzerland, Oct. 23, 2012.

International Search Report and Written Opinion—PCT/US2011/033310, ISA/EPO—Jul. 15, 2011.

Nokia Corporation et al., "Semi-Persistent Scheduling", Aug. 20, 2008, 3GPP Draft; R2-084737 SPS 36300 CR, 3rd Generation Partnership Project (3GPP), Mobile Competence Centre ; 650, Route des Lucioles ; F-06921 Sophia-antipolis Cedex ; France, XP050319706, [retrieved on Aug. 20, 2008].

Panasonic et al: "PDCCH validation for, semi-persistent scheduling", , 3GPP Draft; R1-084598, 3rd Generation Partnership Project (3GPP), Mobile Competence Centre ; 650, Route des Lucioles ; F-06921 Sophia-Antipolis Cedex ; France, no. Prague, Czech Republic; Nov. 18, 2008, XP050317834, [retrieved on Nov. 18, 2008] paragraph [10.1].

Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route des Lucioles ; F-06921 Sophia-Antipolis Cedex ; France, vol. Ran WG1, no. San Francisco, USA; 20100222, Feb. 16, 2010, pp. 1-4, XP050418951, [retrieved on Feb. 16, 2010].

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

502

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

SEMI-PERSISTENT SCHEDULING GRANTS IN HETEROGENEOUS NETWORKS

CLAIM OF PRIORITY

The present Application for Patent is a Continuation Application of U.S. Ser. No. 13/087,170, filed Apr. 14, 2011, entitled "Semi-Persistent Scheduling Grants in Heterogeneous Networks," which claims benefit of U.S. Provisional Patent Application Ser. No. 61/326,193, filed Apr. 20, 2010, entitled, "SPS Grants In HetNet", and assigned to the assignee hereof and hereby expressly incorporated by reference herein.

BACKGROUND

I. Field

Certain aspects of the present disclosure generally relate to wireless communications and, more particularly, to a method for exchanging scheduled transmissions in a heterogeneous network.

II. Background

Wireless communication networks are widely deployed to provide various communication services such as voice, video, packet data, messaging, broadcast, etc. These wireless networks may include multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Time division multiplexing (TDM) partitioning is one of the inter-cell interference coordination (ICIC) mechanisms considered for a heterogeneous network (HetNet) ICIC in a co-channel deployment. For example, in subframes that are pre-allocated to an evolved Node B (eNB), neighbor eNBs may not transmit, hence interference experienced by served user equipments (UEs) may be reduced. Semi-persistent scheduling (SPS) grants may have various available periodicities, which may not be compatible with TDM partitioning. Therefore, a UE may miss an SPS opportunity that was scheduled for a subframe that was not usable by the UE. Hence, using SPS grants with small periodicities in a heterogeneous network with TDM partitioning may require changes which may include adjusting the periodicities of the SPS grants, rescheduling of uplink SPS messages based on resource partitioning information (RPI), and/or determining RPI based on current SPS grants.

Certain aspects of the present disclosure provide a method for wireless communications. The method generally includes determining resource partitioning information (RPI), having a first periodicity, wherein the RPI includes information that identifies subframes that are usable by a user equipment (UE) and protected due to cooperative partitioning of resources between a serving Node B and one or more non-serving Node Bs; sending a semi-persistent scheduling (SPS) grant message identifying one or more subframes for scheduled transmissions, wherein the SPS grant message, having a second periodicity, is determined based, at least in part, on the RPI; and exchanging the scheduled transmissions with the UE according to the SPS grant message.

Certain aspects of the present disclosure provide an apparatus for wireless communications. The apparatus generally includes means for determining resource partitioning information (RPI), having a first periodicity, wherein the RPI includes information that identifies subframes that are usable by a user equipment (UE) and protected due to cooperative partitioning of resources between a serving Node B and one or more non-serving Node Bs; means for sending a semi-persistent scheduling (SPS) grant message identifying one or more subframes for scheduled transmissions, wherein the SPS grant message, having a second periodicity, is determined based, at least in part, on the RPI; and means for exchanging the scheduled transmissions with the UE according to the SPS grant message.

Certain aspects of the present disclosure provide an apparatus for wireless communications. The apparatus generally includes at least one processor configured to determine resource partitioning information (RPI), having a first periodicity, wherein the RPI includes information that identifies subframes that are usable by a user equipment (UE) and protected due to cooperative partitioning of resources between a serving Node B and one or more non-serving Node Bs, send a semi-persistent scheduling (SPS) grant message identifying one or more subframes for scheduled transmissions, wherein the SPS grant message, having a second periodicity, is determined based, at least in part, on the RPI, and exchange the scheduled transmissions with the UE according to the SPS grant message.

Certain aspects provide a computer-program product for wireless communications. The computer-program product typically includes a computer-readable medium having instructions stored thereon, the instructions being executable by one or more processors. The instructions generally include code for determining resource partitioning information (RPI), having a first periodicity, wherein the RPI includes information that identifies subframes that are usable by a user equipment (UE) and protected due to cooperative partitioning of resources between a serving Node B and one or more non-serving Node Bs; code for sending a semi-persistent scheduling (SPS) grant message identifying one or more subframes for scheduled transmissions, wherein the SPS grant message, having a second periodicity, is determined based, at least in part, on the RPI; and code for exchanging the scheduled transmissions with the UE according to the SPS grant message.

Certain aspects of the present disclosure provide a method for wireless communications. The method generally includes receiving a semi-persistent scheduling (SPS) grant message identifying one or more subframes for scheduled transmissions, wherein the SPS grant message, having a first periodicity, is determined based, at least in part, on resource partitioning information (RPI) having a second periodicity, wherein the RPI includes information that identifies subframes that are usable by a user equipment (UE) and protected due to cooperative partitioning of resources between a serving Node B and one or more non-serving Node Bs; and exchanging the scheduled transmissions with the serving Node B according to the SPS grant message.

Certain aspects of the present disclosure provide an apparatus for wireless communications. The apparatus generally includes means for receiving a semi-persistent scheduling (SPS) grant message identifying one or more subframes for scheduled transmissions, wherein the SPS grant message, having a first periodicity, is determined based, at least in part, on resource partitioning information (RPI) having a second periodicity, wherein the RPI includes information that identifies subframes that are usable by a user equipment (UE) and protected due to cooperative partitioning of resources between a serving Node B and one or more non-serving Node Bs; and means for exchanging the scheduled transmissions with the serving Node B according to the SPS grant message.

Certain aspects of the present disclosure provide an apparatus for wireless communications. The apparatus generally includes at least one processor configured to receive a semi-persistent scheduling (SPS) grant message identifying one or more subframes for scheduled transmissions, wherein the SPS grant message, having a first periodicity, is determined based, at least in part, on resource partitioning information (RPI) having a second periodicity, wherein the RPI includes information that identifies subframes that are usable by a user equipment (UE) and protected due to cooperative partitioning of resources between a serving Node B and one or more non-serving Node Bs and exchange the scheduled transmissions with the serving Node B according to the SPS grant message.

Certain aspects provide a computer-program product for wireless communications. The computer-program product typically includes a computer-readable medium having instructions stored thereon, the instructions being executable by one or more processors. The instructions generally include code for receiving a semi-persistent scheduling (SPS) grant message identifying one or more subframes for scheduled transmissions, wherein the SPS grant message, having a first periodicity, is determined based, at least in part, on resource partitioning information (RPI) having a second periodicity, wherein the RPI includes information that identifies subframes that are usable by a user equipment (UE) and protected due to cooperative partitioning of resources between a serving Node B and one or more non-serving Node Bs; and code for exchanging the scheduled transmissions with the serving Node B according to the SPS grant message.

Certain aspects of the present disclosure provide a method for wireless communications. The method generally includes determining resource partitioning information (RPI) that includes information that identifies one or more subframes that are usable by a user equipment (UE) and protected due to cooperative partitioning of resources between a serving Node B and one or more non-serving Node Bs, wherein the RPI is determined based, at least in part, on current semi-persistent scheduling (SPS) grants.

Certain aspects of the present disclosure provide an apparatus for wireless communications. The apparatus generally includes means for determining resource partitioning information (RPI) that includes information that identifies one or more subframes that are usable by a user equipment (UE) and protected due to cooperative partitioning of resources between a serving Node B and one or more non-serving Node Bs, wherein the RPI is determined based, at least in part, on current semi-persistent scheduling (SPS) grants.

Certain aspects of the present disclosure provide an apparatus for wireless communications. The apparatus generally includes at least one processor configured to determine resource partitioning information (RPI) that includes information that identifies one or more subframes that are usable by a user equipment (UE) and protected due to cooperative partitioning of resources between a serving Node B and one or more non-serving Node Bs, wherein the RPI is determined based, at least in part, on current semi-persistent scheduling (SPS) grants.

Certain aspects provide a computer-program product for wireless communications. The computer-program product typically includes a computer-readable medium having instructions stored thereon, the instructions being executable by one or more processors. The instructions generally include code for determining resource partitioning information (RPI) that includes information that identifies one or more subframes that are usable by a user equipment (UE) and protected due to cooperative partitioning of resources between a serving Node B and one or more non-serving Node Bs, wherein the RPI is determined based, at least in part, on current semi-persistent scheduling (SPS) grants.

Various aspects and features of the disclosure are described in further detail below.

BRIEF DESCRIPTION OF THE DRAWINGS

FIG. 5 illustrates example resource partitioning in a heterogeneous network.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
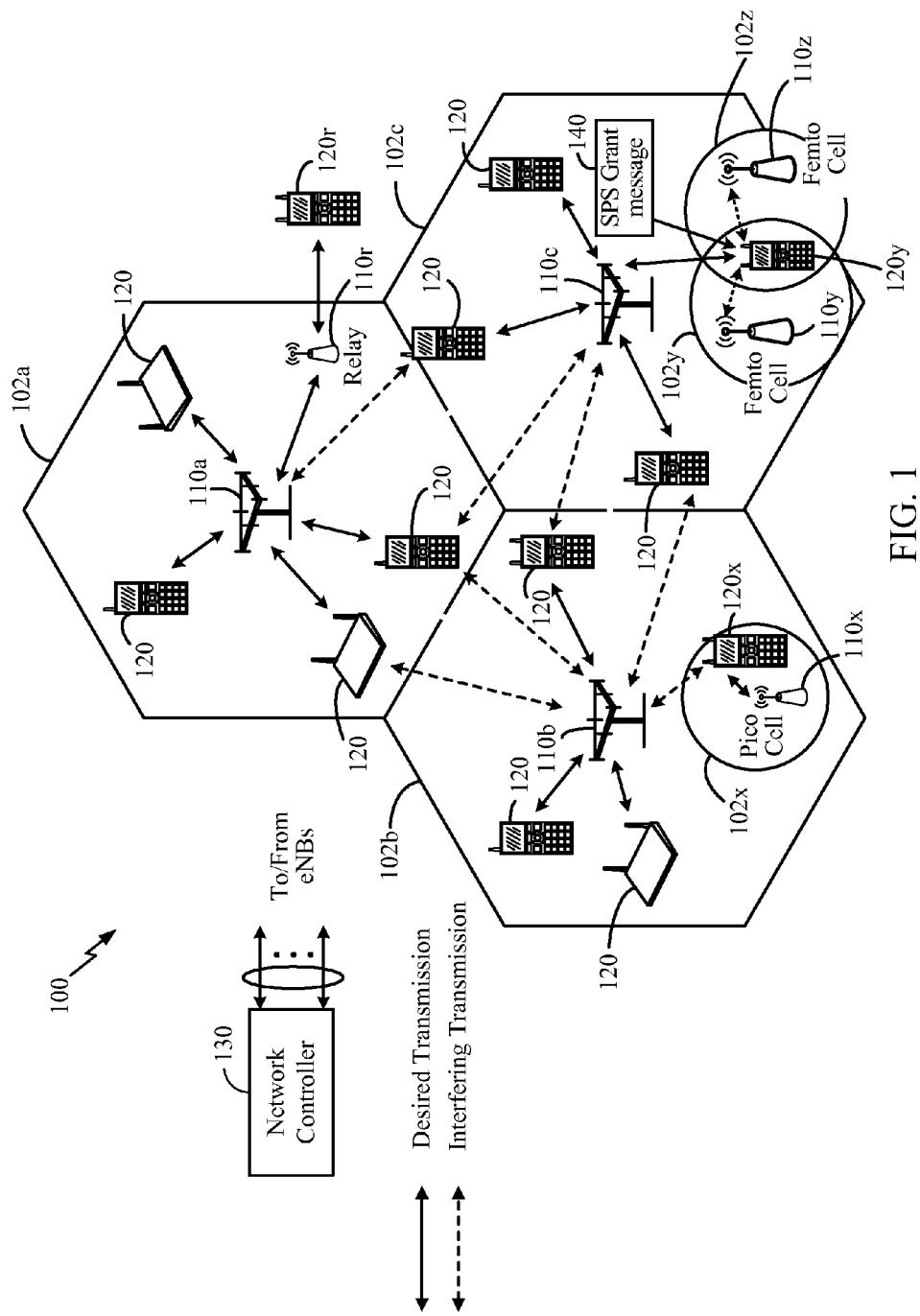
FIG. 1 is a block diagram conceptually illustrating an example of a wireless communications network in accordance with certain aspects of the present disclosure.

FIG. 1 shows a wireless communication network 100, which may include an LTE network. Wireless network 100 may include a number of evolved Node Bs (eNBs) 110 and other network entities. An eNB may include a station that communicates with the UEs, and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with eNBs 110 via a backhaul. eNBs 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may include a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
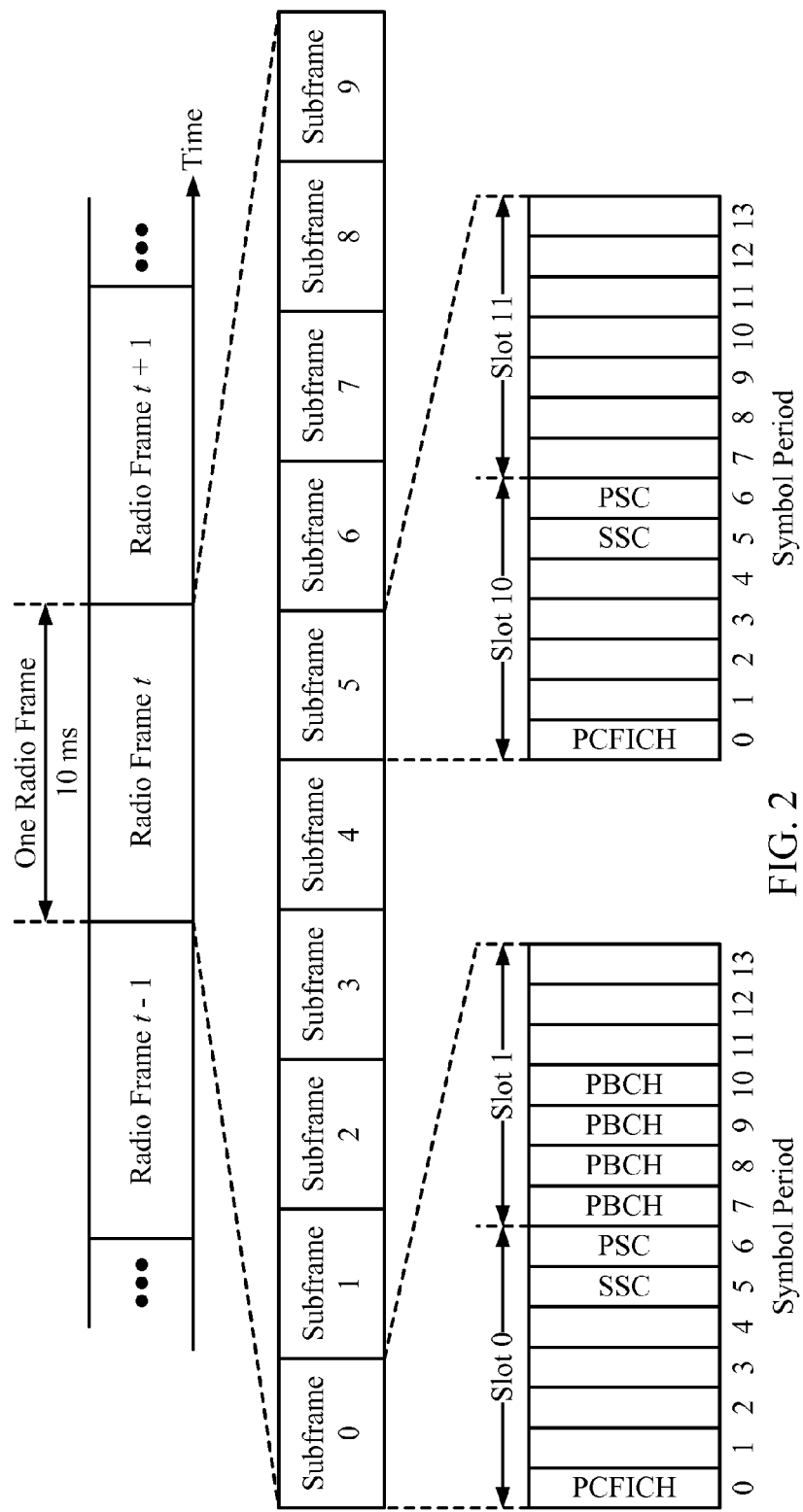
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period, and may be used to send one modulation symbol that may include a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
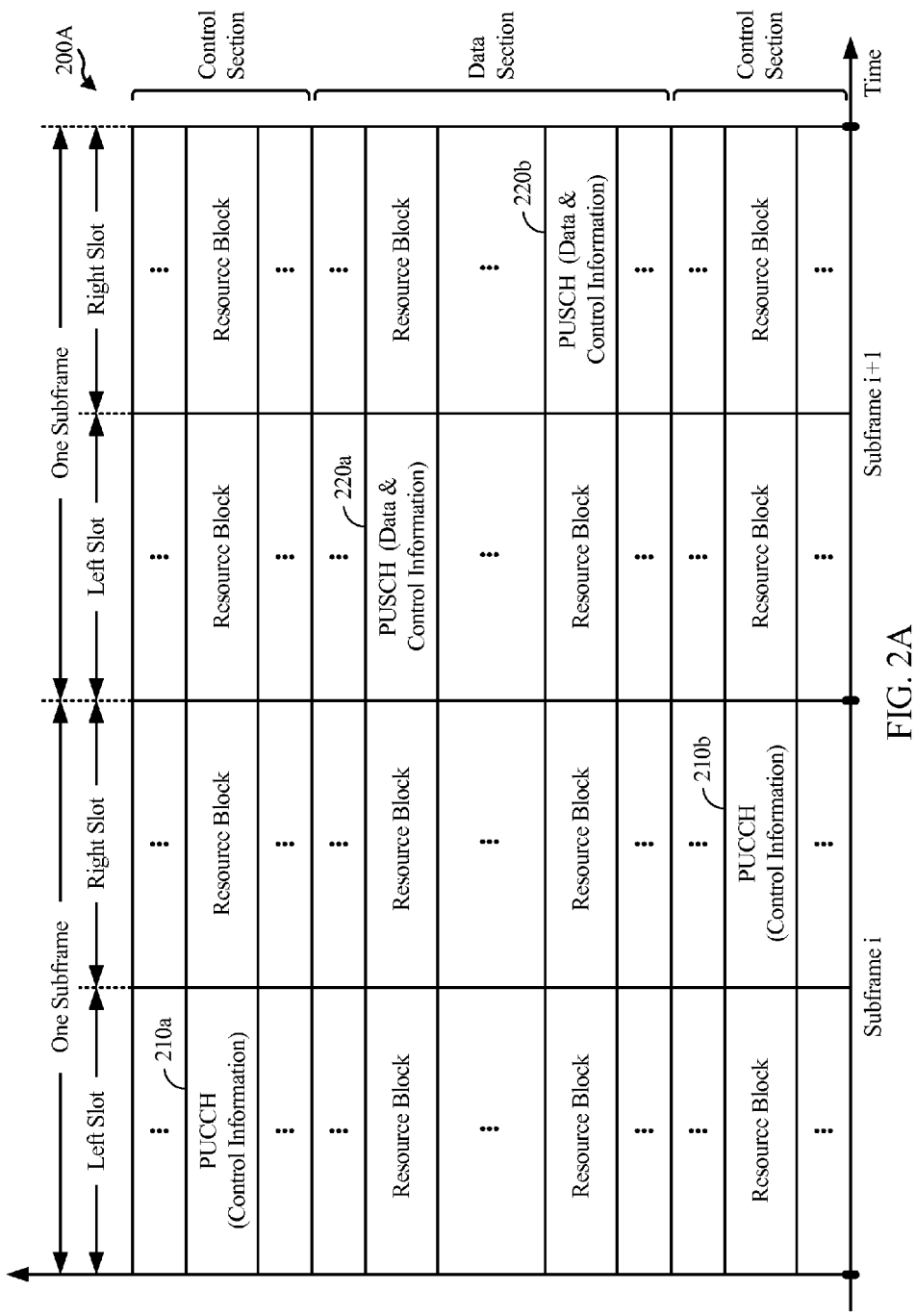
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210 on the assigned resource blocks in the control section. The UE may transmit only data or both data and control information in a Physical Uplink Shared Channel (PUSCH) 220 on the assigned resource blocks in the data section. An uplink transmission may span both slots of a subframe and may hop across frequency as shown in FIG. 2A.

The PSS, SSS, CRS, PBCH, PUCCH and PUSCH in LTE are described in 3GPP TS 36.211, entitled, "Evolved Universal Terrestrial Radio Access (E-UTRA); Physical Channels and Modulation," which is publicly available.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high-received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink. For certain aspects of the present disclosure, the UE 120y may receive a semi-persistent scheduling (SPS) grant message 140 identifying one or more subframes for scheduled transmissions between the UE 120y and the macro eNB 110c, wherein the SPS grant message 140 may be determined based on resource partitioning information (RPI), as will be discussed further herein.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of the eNB at a UE (and not based on the transmit power level of the eNB).

Figure 3:
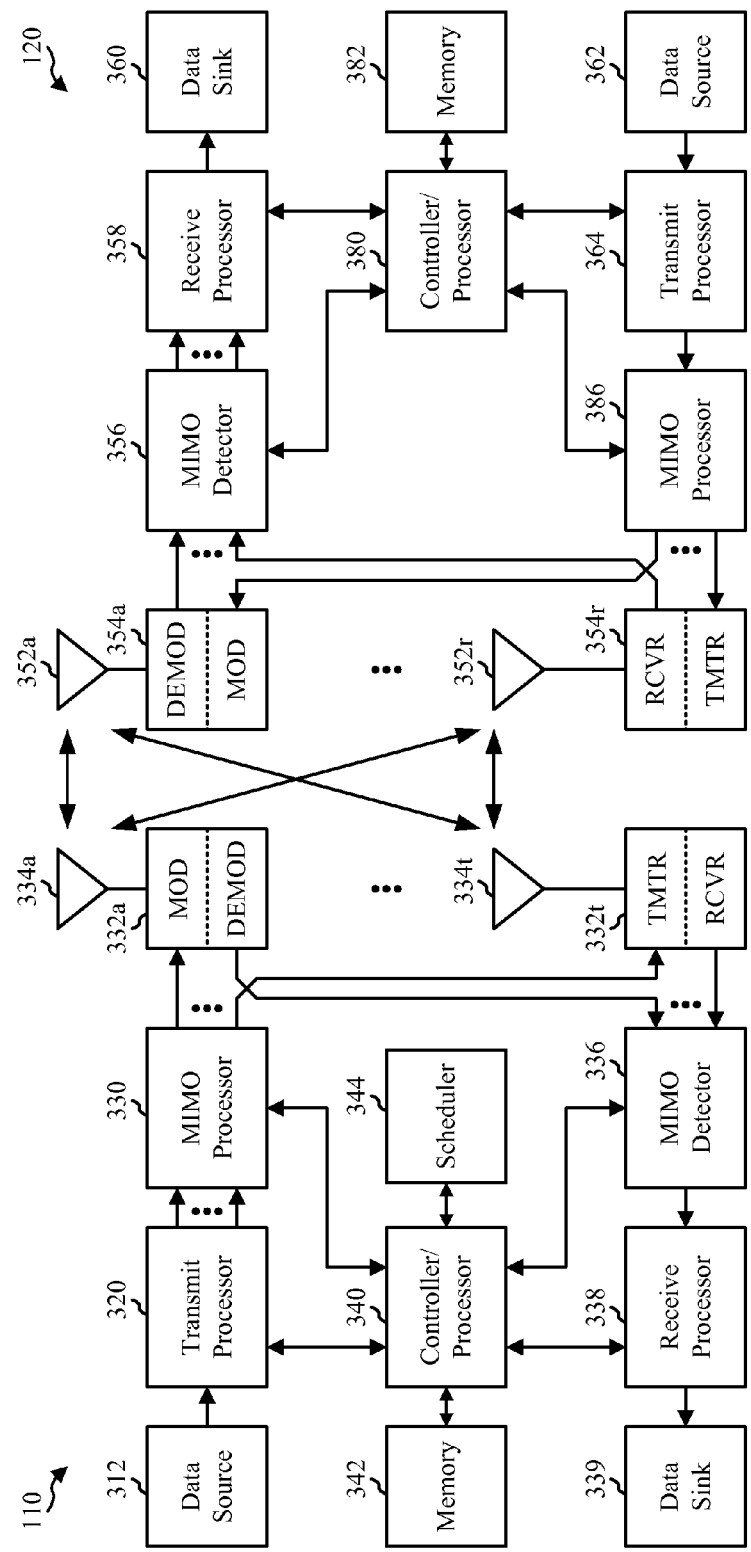
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station/eNB 110 and a UE 120, which may be one of the base stations/eNBs and one of the UEs in FIG. 1. For a restricted association scenario, base station 110 may be macro eNB 110c in FIG. 1, and UE 120 may be UE 120y. Base station 110 may also be a base station of some other type. Base station 110 may be equipped with T antennas 334a through 334t, and UE 120 may be equipped with R antennas 352a through 352r, where in general T≥1 and R≥1.

At base station 110, a transmit processor 320 may receive data from a data source 312 and control information from a controller/processor 340. The control information may be for the PBCH, PCFICH, PHICH, PDCCH, etc. The data may be for the PDSCH, etc. Processor 320 may process (e.g., encode and symbol map) the data and control information to obtain data symbols and control symbols, respectively. Processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At UE 120, antennas 352a through 352r may receive the downlink signals from base station 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for UE 120 to a data sink 360, and provide decoded control information to a controller/processor 380.

On the uplink, at UE 120, a transmit processor 364 may receive and process data (e.g., for the PUSCH) from a data source 362 and control information (e.g., for the PUCCH) from controller/processor 380. Processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to base station 110. At base station 110, the uplink signals from UE 120 may be received by antennas 334, processed by demodulators 332, detected by a MIMO detector 336 if applicable, and further processed by a receive processor 338 to obtain decoded data and control information sent by UE 120. Processor 338 may provide the decoded data to a data sink 339 and the decoded control information to controller/processor 340.

Controllers/processors 340 and 380 may direct the operation at base station 110 and UE 120, respectively. Processor 380 and/or other processors and modules at UE 120 may also perform or direct processes for the techniques described herein. Memories 342 and 382 may store data and program codes for base station 110 and UE 120, respectively. A scheduler 344 may schedule UEs for data transmission on the downlink and/or uplink.

Example Resource Partitioning

According to certain aspects of the present disclosure, when a network supports enhanced interference coordination, the base stations may negotiate with each other to coordinate resources in order to reduce/eliminate interference by the interfering cell's giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" for a macro cell by yielding resources and effectively removing interference. By negotiating for a femto cell to yield resources, the macro UE under the femto cell coverage area may still be able to access its serving macro cell using these yielded resources.

In a radio access system using OFDM, such as E-UTRAN, the yielded resources may be time-based, frequency based, or combination of both. When the coordinated resource partitioning is time based, the interfering cell may simply not use some of the subframes in time domain. When the coordinated resource partitioning is frequency based, the interfering may yield subcarriers in frequency domain. When a combination of both frequency and time, the interfering cell may yield frequency and time resources.

Figure 4:
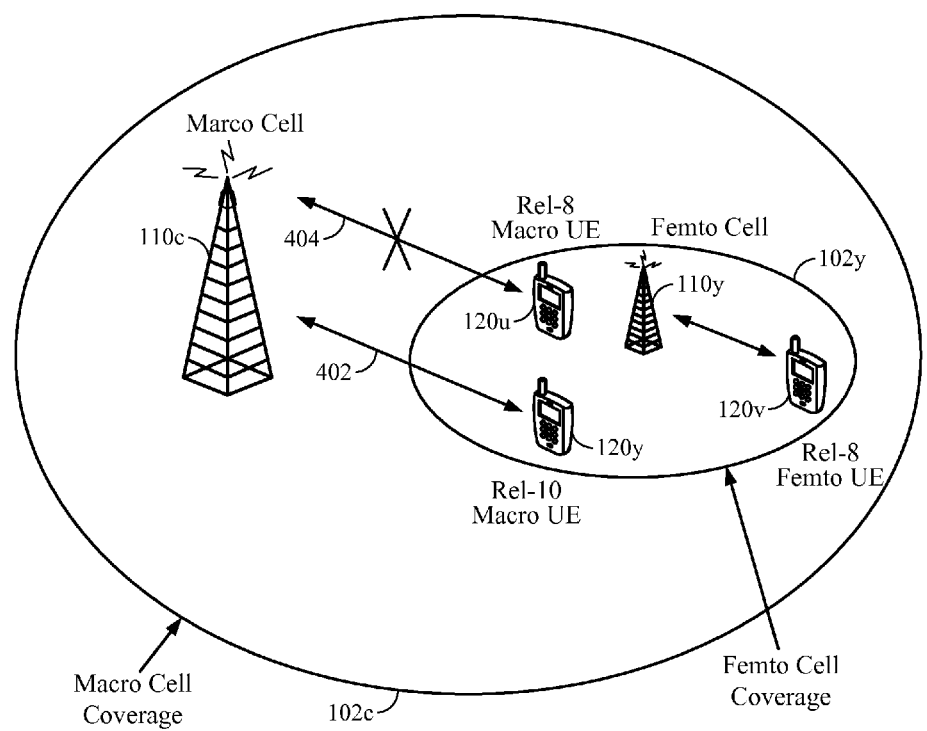
FIG. 4 illustrates an example heterogeneous network.

FIG. 4 illustrates an example scenario where enhanced inter-cell interference coordination (eICIC) may allow a macro UE 120y supporting eICIC (e.g., Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these may be referred to as Semi-static Resource Partitioning information (SRPI). A second of these sets may be referred to as Adaptive Resource Partitioning information (ARPI). As the name implies, SRPI typically does not change frequently, and SRPI may be sent to the UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For the downlink (e.g., from a cell node B to a UE), a partitioning pattern may be mapped to a known subframe (e.g., a first subframe of each radio frame that has SFN value that is a multiple of an integer N). Such a mapping may be applied in order to determine resource-partitioning information for a specific subframe. As an example, a subframe that is subject to coordinated resource partitioning (e.g., yielded by an interfering cell) for the downlink may identified by an index:

$$Index_{SRPI\_DL}=(SFN*10+\text{subframe number})\bmod 8$$

For the uplink, the SRPI mapping may be shifted, for example, by 4 ms. Thus, an example for the uplink may be:

$$Index_{SRPI\_UL}=(SFN*10+\text{subframe number}+4)\bmod 8$$

SRPI may use the following three values for each entry:

U (Use): This value indicates the subframe has been cleaned up from the dominant interference to be used by this cell (i.e., the main interfering cells do not use this subframe).

N (No Use): This value indicates the subframe shall not be used.

X (Unknown): This value indicates the subframe is not statically partitioned. Details of resource usage negotiation between base stations are not known to the UE.

Another possible set of parameters for SRPI can be the following:

U (Use): This value indicates the subframe has been cleaned up from the dominant interference to be used by this cell, (i.e., the main interfering cells do not use this subframe.

N (No Use): This value indicates the subframe shall not be used.

X (Unknown): This value indicates the subframe is not statically partitioned. Details of resource usage negotiation between base stations are not known to the UE.

C (Common): This value may indicate all cells may use this subframe without resource partitioning. This subframe may be subject to interference, so that the base station may choose to use it only for the UE that is not under big interference.

The serving cell's SRPI may be broadcasted over the air. In E-UTRAN, the SRPI of the serving cell may be sent in an MIB, or one of the SIBs. A predefined SRPI may be defined based on the characteristics of cells, e.g., macro cell, pico cell (i.e., with open access) and femto cell (i.e., with closed access). In such a case, encoding of SRPI in the system overhead message may result in more efficient broadcast over the air.

The base station may also broadcast the neighbor cell's SRPI in one of SIBs. For this, SRPI may be sent with its corresponding range of physical cell IDs.

ARPI may represent further resource partitioning information with the detailed information for the 'X' subframes in SRPI. As noted above, detailed information for the 'X' subframes is typically only known to the base stations and UE does not know it. For example, 'X' subframes may be adaptively assigned as AU (same meaning as U), as AN (same meaning as N), or as AC, which are common subframes where both victim and aggressor may be allowed to transmit.

Figure 6:
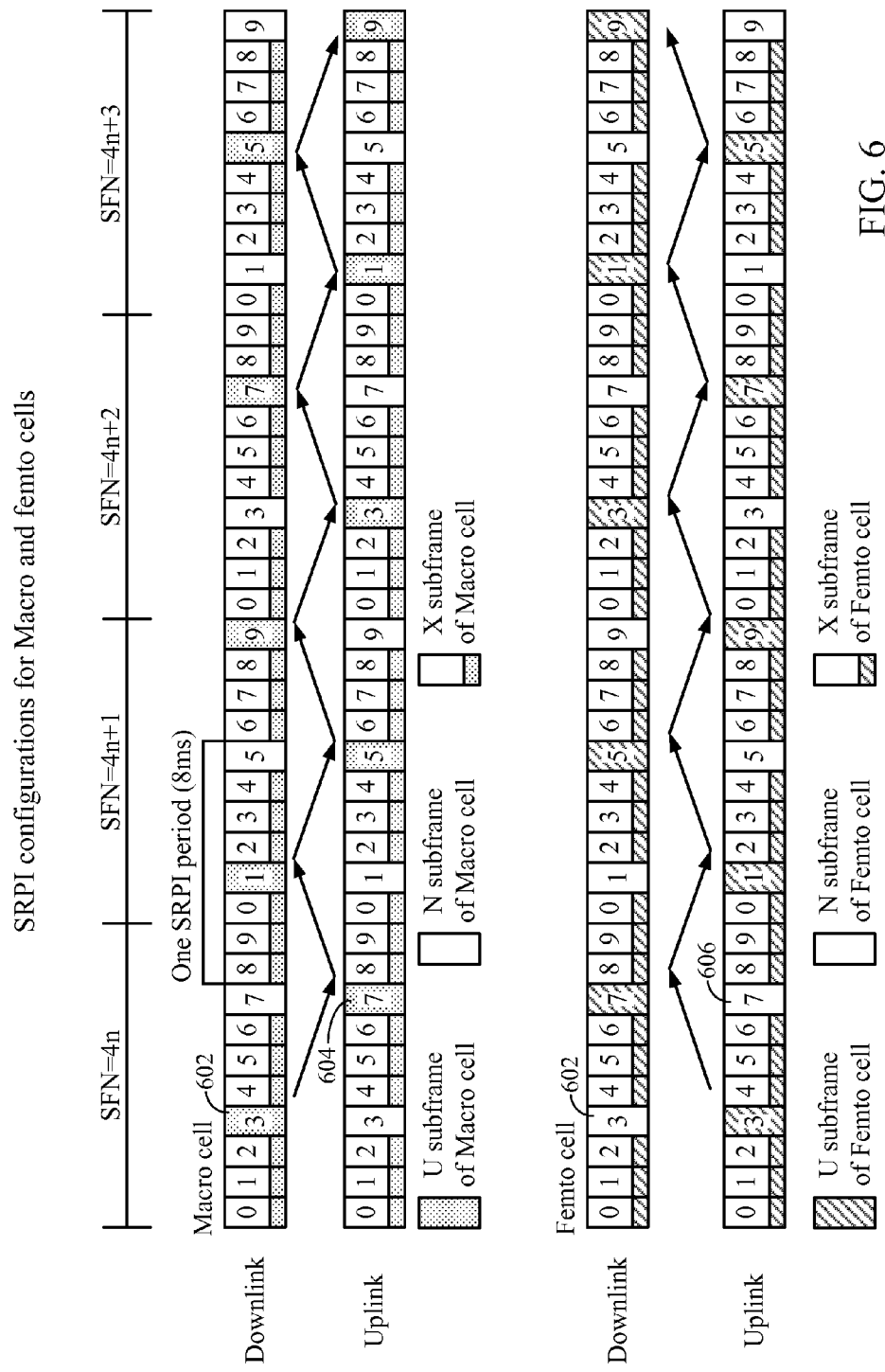
FIG. 6 illustrates example cooperative partitioning of subframes in a heterogeneous network.

FIGS. 5 and 6 illustrate examples of SRPI assignment in the scenario with macro and femto cells, wherein the resource partitioning is implemented with 8 ms periodicity. As described above, the cells may negotiate with each other to coordinate resources in order to reduce/eliminate interference. For example, illustrated in FIG. 5, a subframe of a radio frame may be subject to coordinated resource partitioning, wherein the femto cell may yield resources (N subframe 504), allowing a macro UE under the femto cell coverage to access the macro cell (U subframe 502). FIG. 6 illustrates that, for the downlink, a partitioning pattern may be mapped to a subframe 602 of each radio frame. For the uplink, the SRPI mapping is shifted by 4 ms (i.e., 4 subframes), wherein the femto cell yields resources (N subframe 606), allowing a macro UE under the femto cell coverage to access the macro cell (U subframe 604).

Semi-Persistent Scheduling Grants in Heterogeneous Networks

Time division multiplexing (TDM) partitioning is one of the inter-cell interference coordination (ICIC) mechanisms considered for a heterogeneous network (HetNet) ICIC in a co-channel deployment. For example, in subframes that are pre-allocated to an evolved Node B (eNB), neighbor eNBs may not transmit, hence interference experienced by served user equipments (UEs) may be reduced, as described above. TDM resources for traffic may be negotiated between the eNBs, while allowing a minimum set for control procedures.

For semi-persistent scheduling (SPS), resources may be semi-statically configured by higher network layers and may have a periodicity of 10, 20, 32, 40, 64, 80, 128, 160, 320, or 640 ms, where 10, 20 ms are not compatible with the 8 ms periodicity of TDM. Therefore, a UE may miss an SPS opportunity that was scheduled for a subframe that was not usable by the UE (e.g., X or N subframe) due to the assigned TDM schedule. Hence, using SPS grants with small periodicities (e.g., for delay sensitive traffic) in a heterogeneous network with TDM partitioning may require suitable changes.

For some embodiments, the SPS grant message may be defined with new configurations with a periodicity that is an integer multiple of a periodicity of subframes indicated by the RPI as usable by the UE (e.g., 8 ms and 16 ms). Therefore, each SPS opportunity may be scheduled on a usable subframe, as indicated by the RPI.

Figure 7:
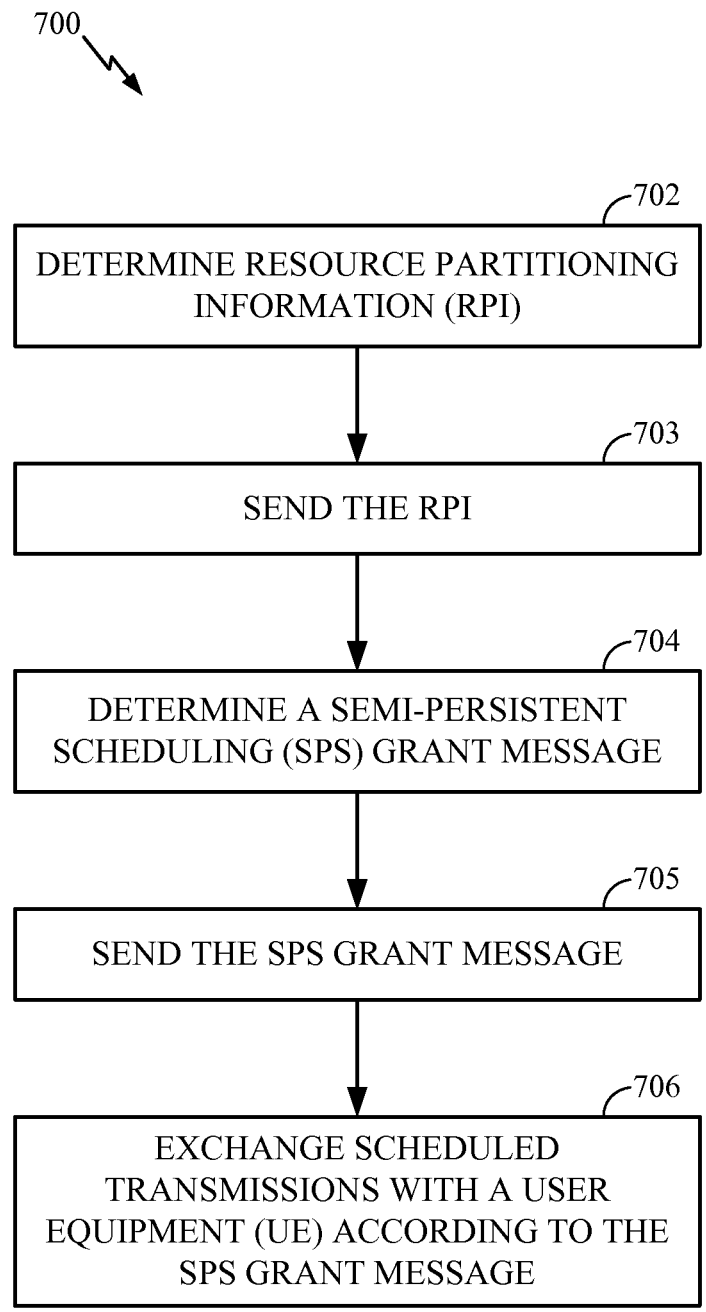
FIG. 7 illustrates example operations for sending a semi-persistent scheduling (SPS) grant message that is determined based, at least in part on, resource partitioning information (RPI), in accordance with certain aspects of the present disclosure.

FIG. 7 illustrates operations 700 for exchanging scheduled transmissions in a heterogeneous network, in accordance with certain aspects of the present disclosure. The operations 700 may be performed, for example, by a serving Node B for sending an SPS grant message.

At 702, the serving Node B may determine resource partitioning information (RPI), having a first periodicity. The RPI may include information that identifies subframes that are usable and protected subframes (e.g., U subframes) according to cooperative partitioning of resources between the serving Node B and one or more non-serving Node Bs. The RPI may further include information that identifies subframes that are not usable (e.g., N subframes) and subframes that are usable but not protected (e.g., X subframes).

At 703, the serving Node B may send the RPI to a UE.

At 704, the serving Node B may determine an SPS grant message, having a second periodicity, based at least in part, on the RPI.

At 705, the serving Node B may send the SPS grant message identifying one or more subframes for scheduled transmissions.

At 706, the serving Node B may exchange the scheduled transmissions with the UE according to the SPS grant message.

Figure 7A:
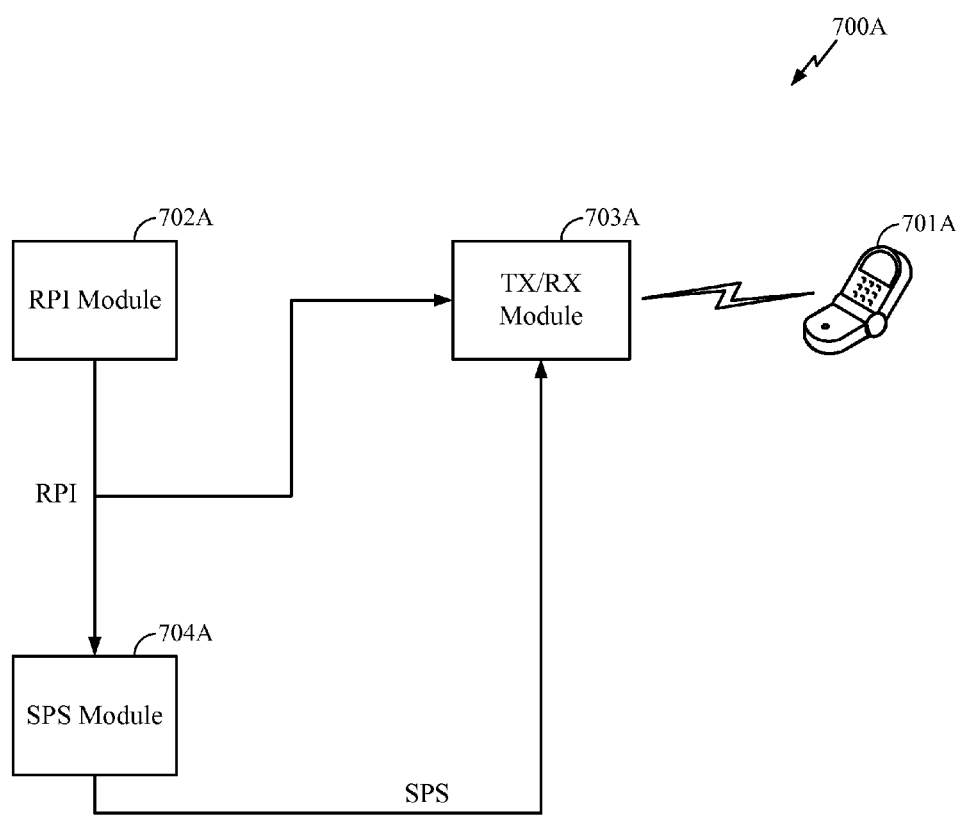
FIG. 7A illustrates example components capable of performing the operations illustrated in FIG. 7.

FIG. 7A illustrates means 700A, corresponding to operations 700 illustrated in FIG. 7. RPI module 702A of a serving Node B may determine RPI, having a first periodicity (step 702). The serving Node B may send the RPI to a UE 701A via the transmitter/receiver module 703A (step 703). SPS module 704A of the serving Node B may determine an SPS grant message, having a second periodicity, based at least in part, on the RPI (step 704). The serving Node B may send the SPS grant message to the UE 701A via the transmitter/receiver module 703A (step 705). The serving Node B may then exchange scheduled transmissions with the UE 701A according to the SPS grant message (step 706).

Figure 7B:
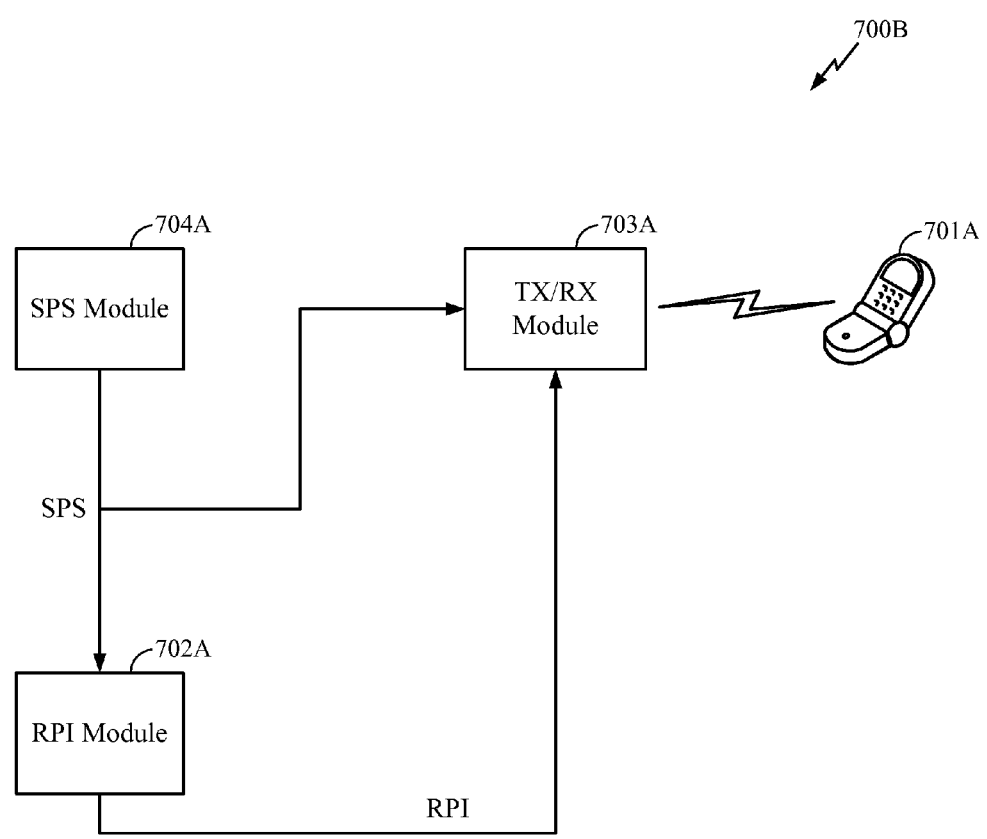
FIG. 7B illustrates example components capable of determining RPI based, at least in part on, current SPS grants, in accordance with certain aspects of the present disclosure.

FIG. 7B illustrates means 700B, illustrating an embodiment as will be explained below, wherein, rather than determining an SPS grant message based on RPI, the RPI module 702A may instead determine the RPI based, at least in part on, current SPS grants.

Figure 8:
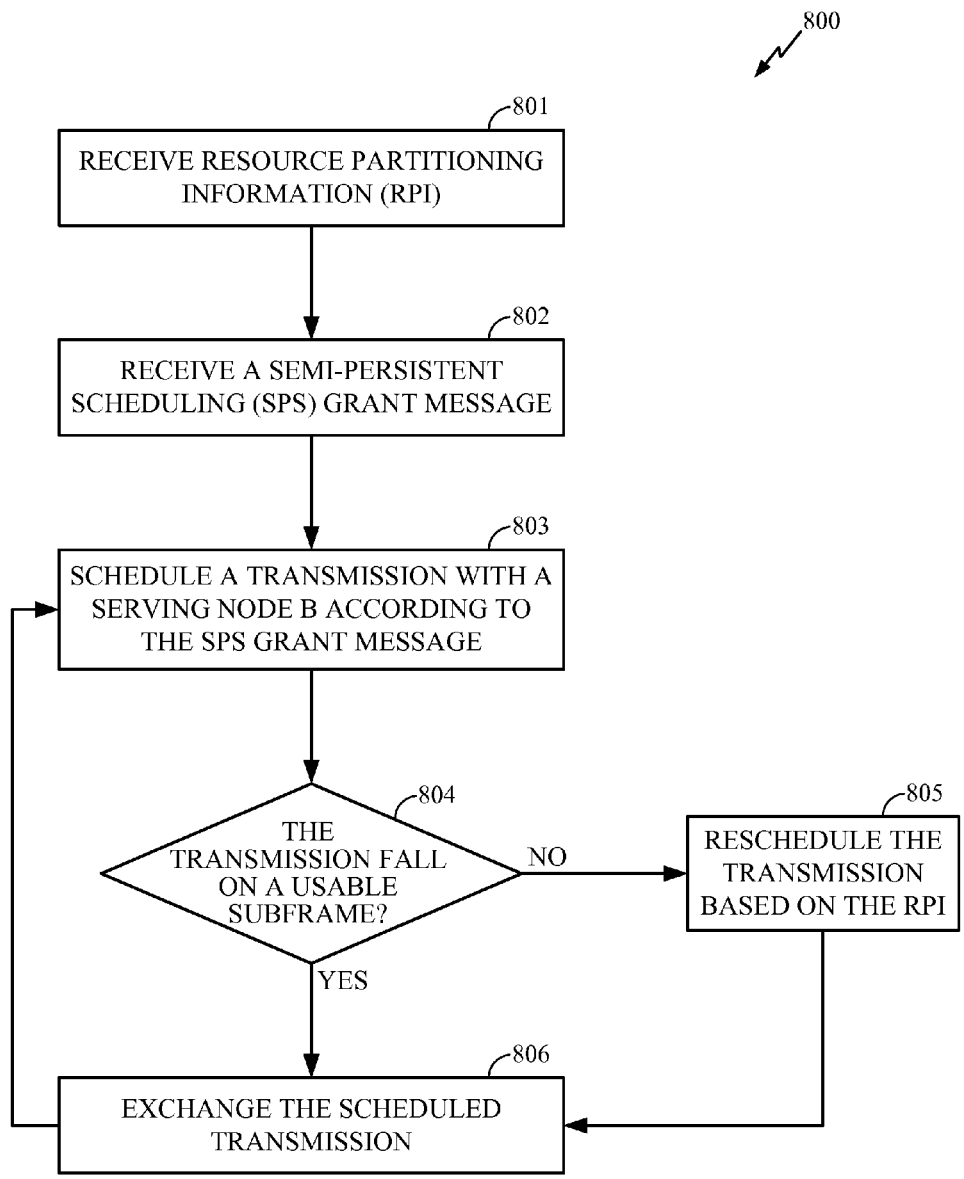
FIG. 8 illustrates example operations for receiving an SPS grant message that is determined based, at least in part on, RPI, in accordance with certain aspects of the present disclosure.

FIG. 8 illustrates operations 800 for exchanging scheduled transmissions in a heterogeneous network, in accordance with certain aspects of the present disclosure. The operations 800 may be performed, for example, by a UE for receiving an SPS grant message.

At 801, the UE may receive RPI including information that identifies subframes that are usable by the UE and protected due to cooperative partitioning of resources between a serving Node B and one or more non-serving Node Bs.

At 802, the UE may receive an SPS grant message identifying one or more subframes for scheduled transmissions, wherein the SPS grant message, having a first periodicity, may be determined based, at least in part, on the RPI having a second periodicity.

At 803, the UE may schedule a transmission with the serving Node B according to the SPS grant message.

At 804, the UE may determine whether the transmission falls on usable subframe.

At 806, if the transmission falls on a usable subframe, the UE may exchange the scheduled transmission with the serving Node B.

At 805, if the transmission does not fall on a usable subframe, the UE may reschedule the transmission based on the RPI, as will be discussed further herein.

Figure 8A:
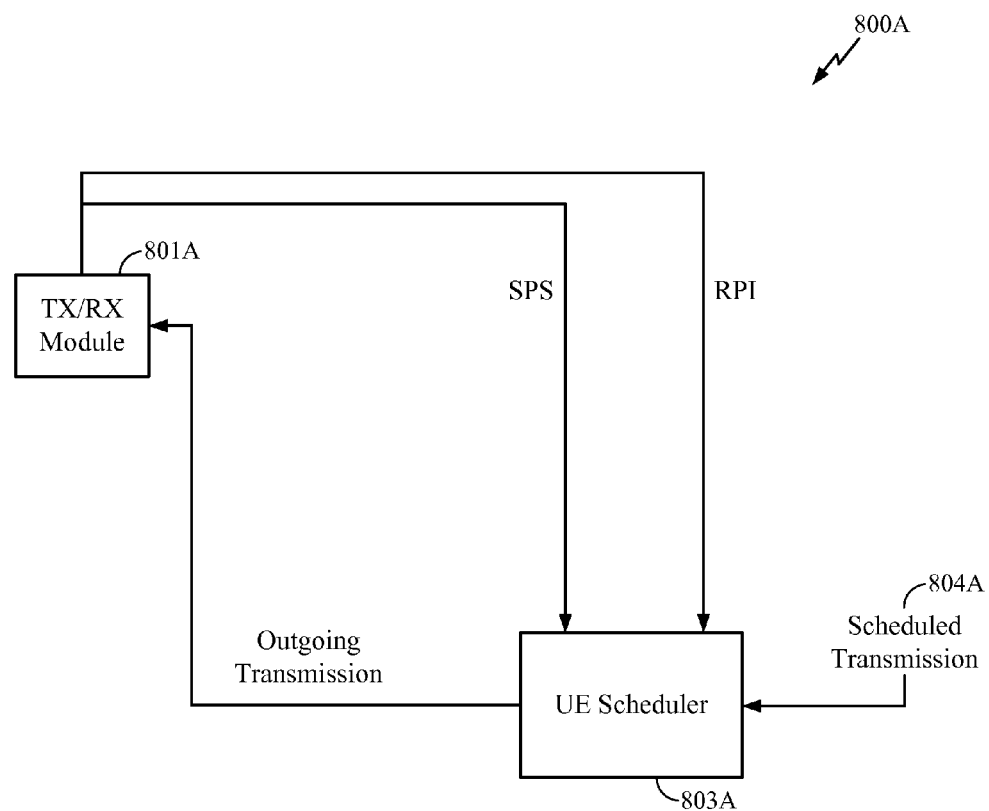
FIG. 8A illustrates example components capable of performing the operations illustrated in FIG. 8.

FIG. 8A illustrates means 800A, corresponding to operations 800 illustrated in FIG. 8. Transmitter/receiver module 801A of a UE may receive RPI and an SPS grant message from a serving Node B (steps 801 and 802). The RPI may be determined based, at least in part, on the SPS grant message, or vice versa. UE scheduler 803A may schedule a transmission 804A with the serving Node B according to the SPS grant message (step 803). If the scheduled transmission falls on a usable subframe, the UE scheduler may exchange the scheduled transmission with the serving Node B via the transmitter/receiver module 801A (step 806). However, if the scheduled transmission does not fall on a usable subframe, the UE scheduler 803A may reschedule the transmission based on the RPI (step 805).

For some embodiments, SPS opportunities that are scheduled for subframes that are not protected under SRPI (e.g., X subframes and/or N subframes) may be skipped. Due to the incompatible periodicities between TDM partitioning and SPS opportunities, some subframes that are scheduled with SPS opportunities may be protected and some others may not be protected. An eNB and a UE may agree that only U subframes may be used (i.e., protected under SRPI), such that if a subframe belonging to an SPS opportunity lies on a non-U subframe, the non-U subframe may not be used. This may hold for both DL SPS and UL SPS.

In UL SPS, subframes that may not be used for transmission because they are not protected may not be counted as "empty transmissions" for the sake of implicit release. However, if a missed UL SPS opportunity was scheduled for a U subframe, the missed opportunity may be counted as an empty transmission. After a certain number of empty transmissions, the SPS opportunities may be released.

Figure 9:
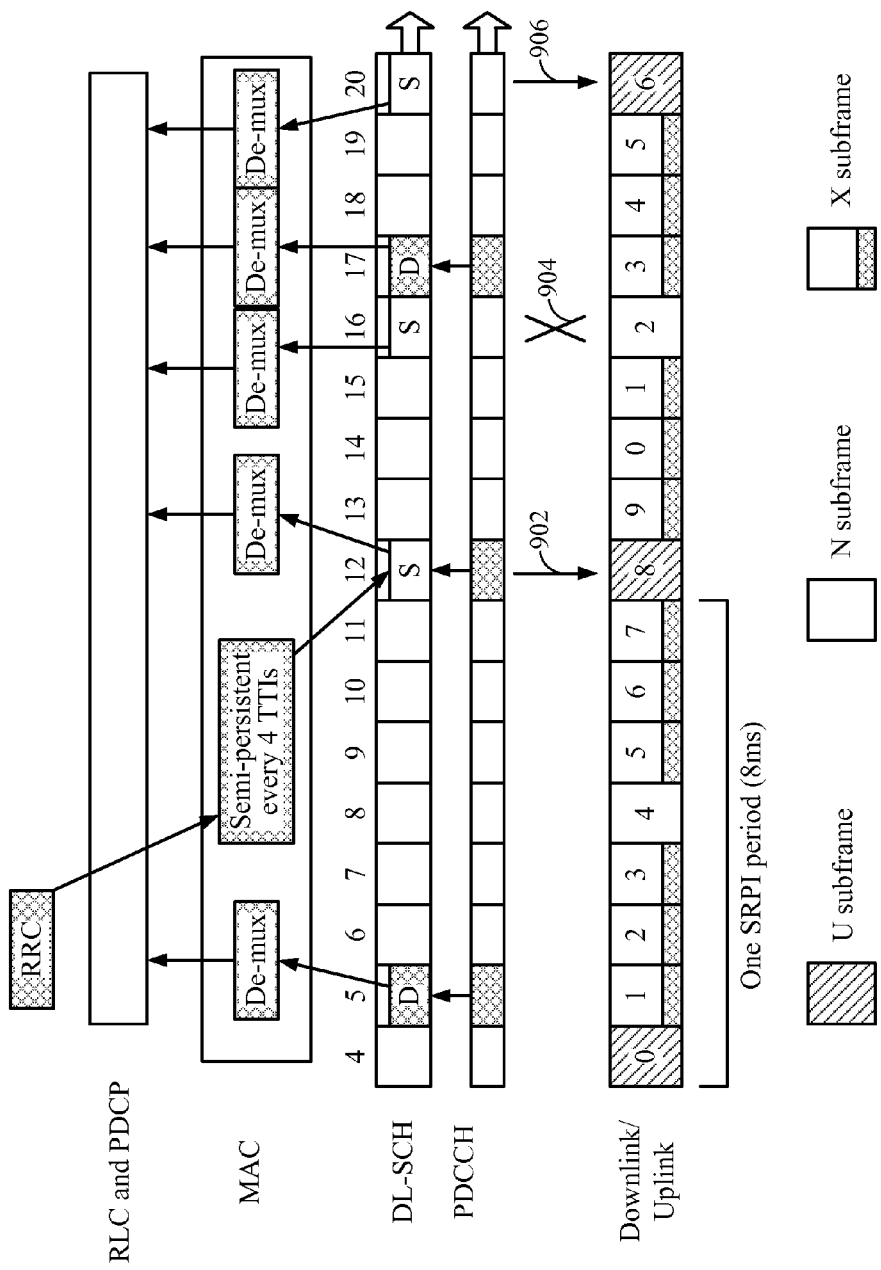
FIGS. 9-12 illustrate examples of a UE receiving an SPS grant message to schedule transmissions between a serving Node B and the UE, in accordance with certain aspects of the present disclosure.

FIG. 9 illustrates an example of SPS opportunities that are scheduled for one or more subframes determined based, at least in part, on an RPI to schedule transmissions between a serving Node B and a UE, in accordance with certain aspects of the present disclosure. The SPS grant message may be received at the UE in a U subframe 902. The serving Node B and the UE may agree that only U subframes may be usable by the UE and protected due to cooperative partitioning of resources between the serving Node B and one or more non-serving Node Bs. Therefore, the N subframe 904 belonging to an SPS opportunity may not be used, but the subsequent U subframe 906 may be used.

For some embodiments, if a UE receives a PDCCH SPS activation grant in an X subframe, the UE may assume that SPS opportunities scheduled for X subframes is dynamically usable (e.g., in AU or AC subframes). In other words, the serving eNB may ensure that the X subframe, and periodic repetitions of the X subframe (i.e., as indicated by RPI), are dynamically usable. Although the UE may not know detailed information for X subframes, due to resource usage negotiations between base stations (e.g., adaptive partitioning), the UE may determine not to skip the unprotected subframes apart from those marked N. For some embodiments, if a subframe associated with an SPS opportunity is skipped (e.g., because it is an N subframe), the UE may use the next U or AU/AC subframe. The AU/AC subframe may be known only if the PDCCH SPS activation grant was received in a non-U subframe, wherein the UE may know that this specific subframe within the interlace must be AU or AC. In addition, the UE may assume that, during the lifetime of the current SPS grant, adaptive partitioning does not change (i.e., the eNB may ensure that, if partitioning changes, the SPS grant may be revoked). If a missed UL SPS opportunity was scheduled for a U or X subframe, the missed opportunity may be counted as an empty transmission.

Figure 10:
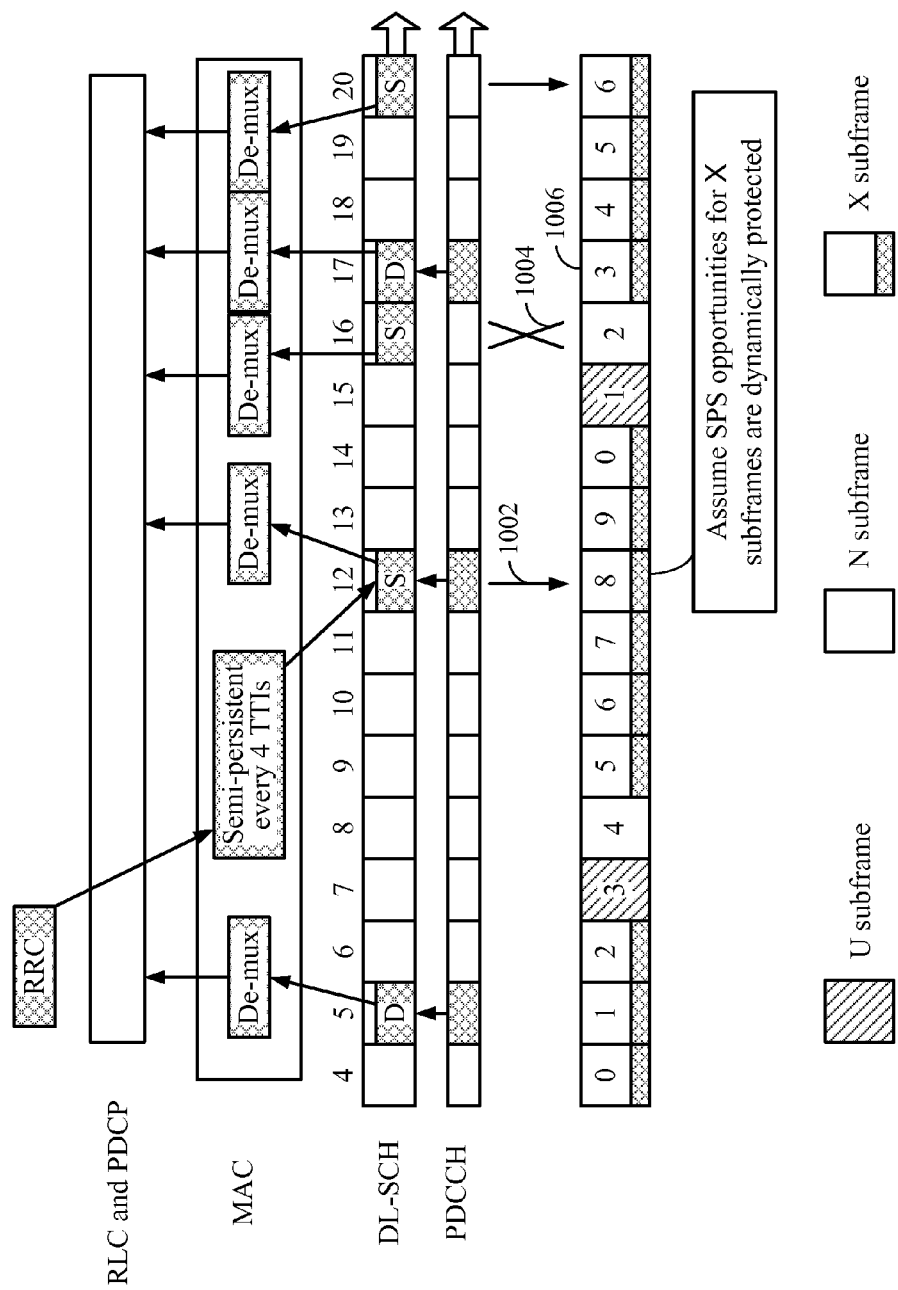

FIG. 10 illustrates an example of SPS opportunities that are scheduled for one or more subframes determined based, at least in part, on a PDCCH SPS activation grant received in an X subframe 1002, in accordance with certain aspects of the present disclosure. The UE may assume that SPS opportunities scheduled for X subframes is dynamically usable and may determine not to skip the unprotected subframes apart from those marked N. Therefore, the N subframe 1004 belonging to an SPS opportunity may not be used. However, the UE may use the next X subframe 1006 (e.g., AU/AC subframe), wherein the UE may know that this specific subframe within the interlace must be AU or AC.

For some embodiments, the eNB may provide an offset to the UE that may be used by the UE to determine which backup subframe belonging to an SPS opportunity may be used when a subframe is skipped (applicable for both DL and UL SPS). The offset may be included in downlink control information carrying the SPS grant message, or may be obtained from upper layers. The offset may be provided as a new information element (IE) in the SPS-configuration radio resource control (RRC) parameter, or may be signaled into the PDCCH activation grant. For example, a cyclic shift demodulation reference signal (DM-RS) field in downlink control information (DCI) format 0 may be assumed to be 000 (3 bits) in an SPS activation grant. For some embodiments, the 3 bits may be used to encode the offset, when an SPS activation grant is signaled to a Rel-10 UE. However, Rel-8 UEs may require this field to be 000 in order to validate the grant.

Figure 11:
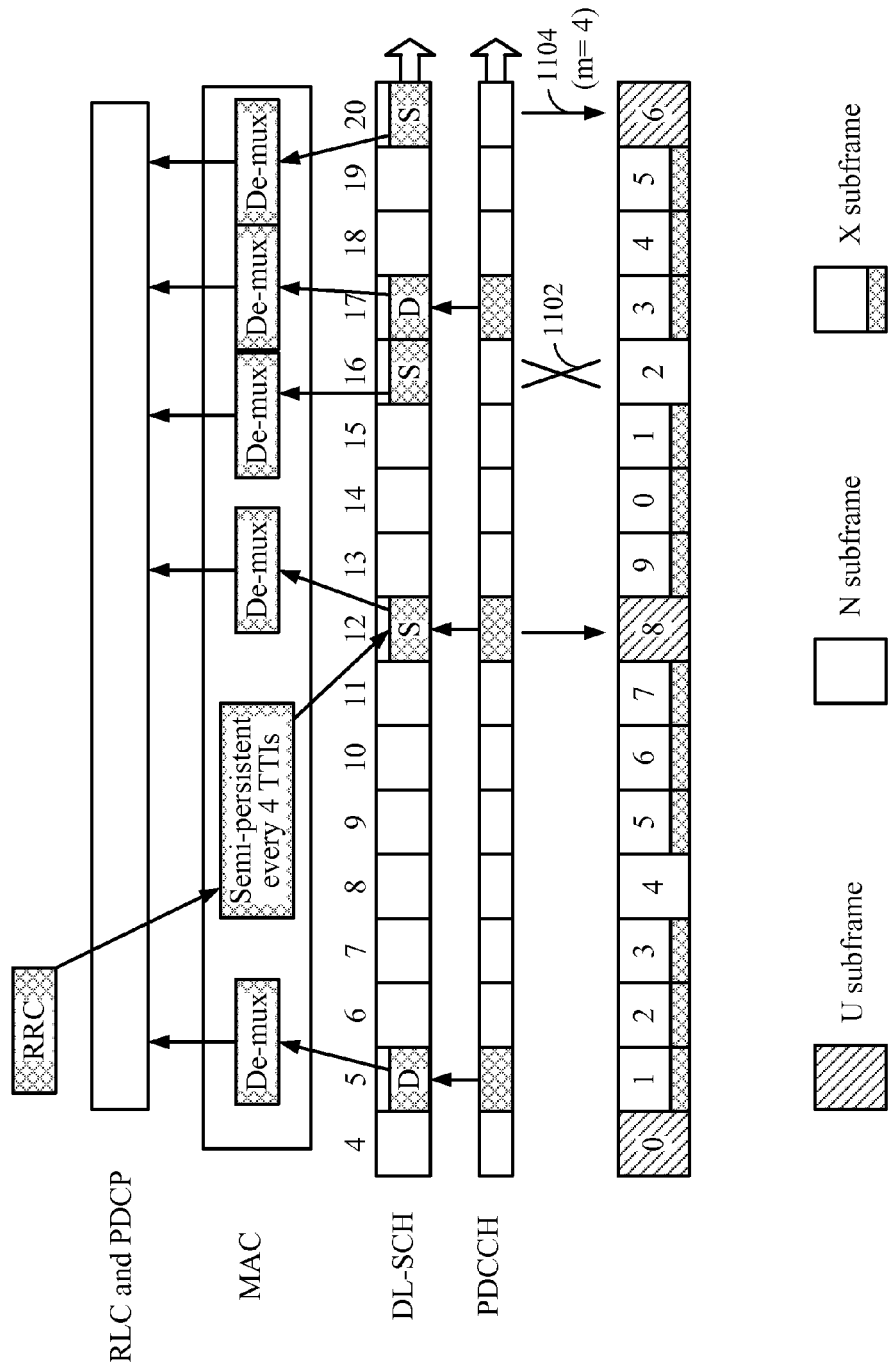
Figure 12:
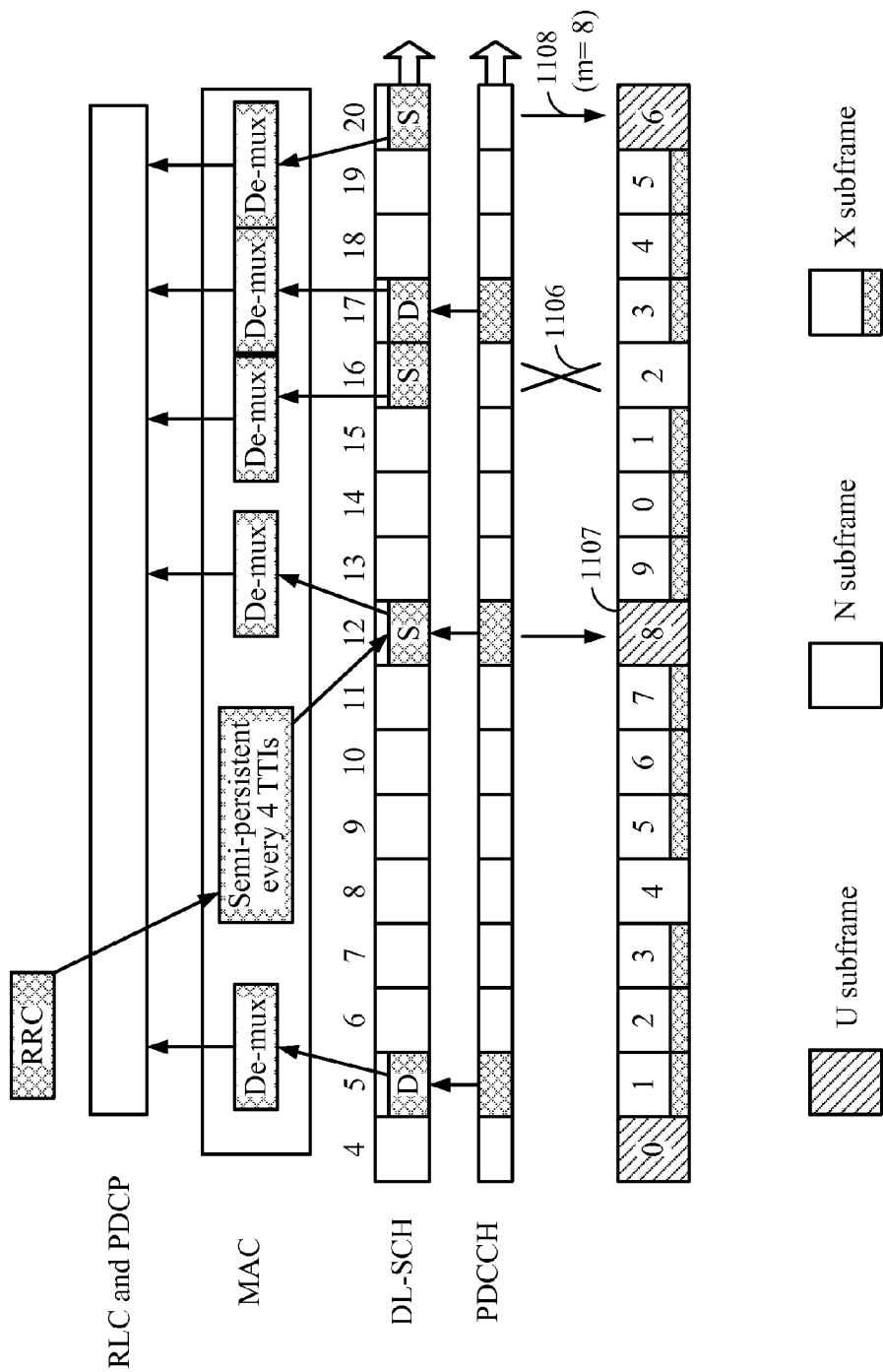

Similarly, a HARQ process number in DCI formats 1/1A and 2/2A/2B may be assumed to be 000 in an SPS activation grant. These 3 bits (4 bits in TDD) may be replaced by the offset when an SPS activation is signaled to a Rel-10 UE. Referring to FIG. 11, assuming that subframe n 1102 belongs to an SPS grant but is not a U subframe (i.e., N subframe as shown in FIG. 11), then this subframe 1102 may be skipped and subframe n+m 1104 may be used in place of subframe n 1102, where m may be the offset specified above (i.e., m=4 as shown in FIG. 11). Alternatively, referring to FIG. 12, the offset may represent a displacement with respect to the most recent U subframe 1107 (i.e., subframe p), namely if subframe n 1106 is skipped, subframe p+m 1108 may be used, p being the maximum integer such that p is less than or equal to n and p mod 8 may denote a U subframe (i.e., m=8 as shown in FIG. 12).

For some embodiments, instead of skipping SPS opportunities that are not protected under SRPI (e.g., X subframes and/or N subframes), only reserved subframes (i.e., those where no transmission is allowed, such as N subframes) may be skipped. In other words, if a subframe belonging to an SPS opportunity either lies on a U subframe (protected under SRPI) or on an X (unknown) subframe, it may be used for transmission. The eNB may ensure that SPS opportunities are scheduled for U and X (e.g., AU/AC) subframes, by suitably configuring the SPS period and the subframe used for SPS activation, such that SPS opportunities may never lie on AN or N subframes. If a missed UL SPS opportunity was scheduled for a U or X subframe, the missed opportunity may be counted as an empty transmission. After a certain number of empty transmissions, the SPS opportunities may be released.

Subframes of different types (e.g., protected versus unprotected) may have completely different qualities. Traditionally, an SPS grant may provide a single resource allocation and a single modulation and coding scheme (MCS). The same MCS used on subframes of a different quality may reduce performance. For some embodiments, the SPS grant may provide two MCS, denoted as clean MCS and unclean MCS. The indication of the second MCS may be offset from the indication of the first MCS. The clean MCS may be used on protected subframes (e.g., U/AU subframes), whereas the unclean MCS may be used on any other subframe used for transmissions (e.g., AC subframes).

Further, different frequency resources may be assigned as well, one for protected subframes and one for unprotected subframes. Different amount of resource blocks (RBs) may be desired on protected versus unprotected subframes. There may be a frequency resource partitioning among eNBs of different power classes on unprotected subframes.

For some embodiments, doubling the information (i.e., MCS and possibly resource allocation) in an SPS DL or UL grant in PDSCH may be performed by sending two different PDCCHs with two SPS cell radio network temporary identifier (C-RNTI) identities, for example, in a same subframe or consecutive subframes within a predefined window. Alternatively, the DCI payload may be increased to account for additional fields. For some embodiments, the unclean channel quality indicator (CQI) may be equal to the clean CQI minus a delta, where delta may be provided to the UE through upper layer signaling (e.g., in the RRC message for SPS configuration).

For some embodiments, rather than a clean and unclean MCS, the same MCS may be used, but with different power control setpoints. At least one power control setpoint may be provided by upper layers or in the SPS grant message. In current specifications, RRC parameter p0-UE-PUSCH-Persistent may define UL power control for SPS. Two UL power control parameters for SPS may be used by Rel-10 UEs depending on subframe type. Rel-8 UEs may always use the existing parameter only, but Rel-10 UEs may interpret both and may use them accordingly. The existing parameter may represent the average power, while additional parameter may include a delta.

For some embodiments, rather than determining an SPS grant message based on RPI, as previously described, the RPI may instead be determined based, at least in part on, current SPS grants, as illustrated in FIG. 7B. Periodically, or triggered by some specific events (e.g., a change in load conditions), an optimization algorithm may be carried out which may update the resource partitioning vectors for one or more eNBs (e.g., by increasing the resources that an aggressor eNB cannot use and consequently increasing the protected resources for the victim eNB). The subframe(s) that are exchanged between the eNBs may be determined by current SPS grants for at least one of the serving eNB and the one or more non-serving eNBs. Current SPS grants may also have an impact on the decision on whether to exchange resources or not.

Therefore, SPS opportunities may be scheduled on U and X (AU/AC) subframes. For example, a 20 ms SPS allocation may be considered, wherein an eNB may provide a PDCCH activation grant in a protected subframe (subframe n). Transmission opportunities in subframes n+40, n+80, etc., may lie on protected subframes, such as U subframes (i.e., multiples of interlace periodicity of 8 ms). Transmission opportunities in subframes n+20, n+60, etc. may lie in adaptively assigned subframes (i.e., multiples of 20 ms SPS period). In other words, when negotiation of adaptive subframes among eNBs is carried out, a macro eNB may attempt to allocate subframe n+20, n+60, etc. as AU or AC. In this way, SPS allocations with 20 ms period may work flawlessly, wherein both the U and X (AU/AC) subframes may be usable. For some embodiments, the RPI may remain the same to a prior RPI based, at least in part, on the current SPS grants. Femto eNBs may not want to achieve this because SPS is mainly useful for macros eNBs, where several connected UEs may be present at the same time. A similar adaptive allocation may be designed, for example, for a 10 ms SPS period.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   determining partitioning information having a first periodicity, wherein the partitioning information includes at least information that identifies subframes that are usable by a mobile station (MS) and protected due to cooperative partitioning of resources between a serving base station (BS) and one or more non-serving BSs;
   scheduling the MS based, at least in part, on the partitioning information determined; and
   exchanging transmissions with the MS according to the scheduling.

2. The method of claim 1, wherein the scheduling comprises sending a grant message identifying one or more subframes for scheduled transmissions.

3. The method of claim 2, wherein the grant message has a second periodicity determined based, at least in part, on the partitioning information.

4. The method of claim 1, wherein the partitioning information further includes information that identifies one or more subframes that are not usable by the MS.

5. The method of claim 4, wherein the scheduling comprises sending a grant message, wherein the grant message comprises an offset from a subframe corresponding to a grant opportunity, wherein the offset indicates a subframe for use if the subframe corresponding to the grant opportunity is unknown or not usable by the MS.

6. An apparatus for wireless communications, comprising:
   means for determining partitioning information having a first periodicity, wherein the partitioning information includes at least information that identifies subframes that are usable by a mobile station (MS) and protected due to cooperative partitioning of resources between a serving base station (BS) and one or more non-serving BSs;
   means for scheduling the MS based, at least in part, on the partitioning information determined; and
   means for exchanging transmissions with the MS according to the scheduling.

7. The apparatus of claim 6, wherein the means for scheduling comprises means for sending a grant message identifying one or more subframes for scheduled transmissions.

8. The apparatus of claim 7, wherein the grant message has a second periodicity determined based, at least in part, on the partitioning information.

9. The apparatus of claim 6, wherein the partitioning information further includes information that identifies one or more subframes that are not usable by the MS.

10. The apparatus of claim 9, wherein the means for scheduling comprises means for sending a grant message, wherein the grant message comprises an offset from a subframe corresponding to a grant opportunity, wherein the offset indicates a subframe for use if the subframe corresponding to the grant opportunity is unknown or not usable by the MS.

11. An apparatus for wireless communications, comprising:
- a memory; and
- at least one processor coupled to the memory, and configured to:
  - determine partitioning information having a first periodicity, wherein the partitioning information includes at least information that identifies subframes that are usable by a mobile station (MS) and protected due to cooperative partitioning of resources between a serving base station (BS) and one or more non-serving BSs;
  - schedule the MS based, at least in part, on the partitioning information determined; and
  - exchange transmissions with the MS according to the schedule.

12. The apparatus of claim 11, wherein the at least one processor configured to schedule comprises the at least one processor configured to send a grant message identifying one or more subframes for scheduled transmissions.

13. The apparatus of claim 12, wherein the grant message has a second periodicity determined based, at least in part, on the partitioning information.

14. The apparatus of claim 11, wherein the partitioning information further includes information that identifies one or more subframes that are not usable by the MS.

15. The apparatus of claim 14, wherein the at least one processor configured to schedule comprises the at least one processor configured to send a grant message, wherein the grant message comprises an offset from a subframe corresponding to a grant opportunity, wherein the offset indicates a subframe for use if the subframe corresponding to the grant opportunity is unknown or not usable by the MS.

16. A computer-program product stored on a non-transitory computer-readable medium and comprising code to be executed by a processor for:
- determining partitioning information having a first periodicity, wherein the partitioning information includes at least information that identifies subframes that are usable by a mobile station (MS) and protected due to cooperative partitioning of resources between a serving base station (BS) and one or more non-serving BSs;
- scheduling the MS based, at least in part, on the partitioning information determined; and
- exchanging transmissions with the MS according to the scheduling.

17. The computer-program product of claim 16, wherein the scheduling comprises sending a grant message identifying one or more subframes for scheduled transmissions.

18. The computer-program product of claim 17, wherein the grant message has a second periodicity determined based, at least in part, on the partitioning information.

19. The computer-program product of claim 16, wherein the partitioning information further includes information that identifies one or more subframes that are not usable by the MS.

20. The computer-program product of claim 19, wherein the scheduling comprises sending a grant message, wherein the grant message comprises an offset from a subframe corresponding to a grant opportunity, wherein the offset indicates a subframe for use if the subframe corresponding to the grant opportunity is unknown or not usable by the MS.

21. A method for wireless communications, comprising:
- receiving a schedule for scheduled transmissions, wherein the schedule is determined based, at least in part, on partitioning information having a first periodicity, wherein the partitioning information includes at least information that identifies subframes that are usable by a mobile station (MS) and protected due to cooperative partitioning of resources between a serving base station (BS) and one or more non-serving BSs; and
- exchanging the scheduled transmissions with the serving BS according to the schedule.

22. The method of claim 21, wherein receiving the schedule comprises receiving a grant message identifying one or more subframes for the scheduled transmissions, wherein the grant message has a second periodicity determined based, at least in part, on the partitioning information.

23. The method of claim 21, wherein the partitioning information further includes information that identifies one or more subframes that are not usable by the MS.

24. The method of claim 23, wherein the receiving the schedule comprises receiving a grant message, wherein the grant message comprises an offset from a subframe corresponding to a grant opportunity, wherein the offset indicates a subframe for use if the subframe corresponding to the grant opportunity is unknown or not usable by the MS.

25. An apparatus for wireless communications, comprising:
- means for receiving a schedule for scheduled transmissions, wherein the schedule is determined based, at least in part, on partitioning information having a first periodicity, wherein the partitioning information includes at least information that identifies subframes that are usable by a mobile station (MS) and protected due to cooperative partitioning of resources between a serving base station (BS) and one or more non-serving BSs; and
- means for exchanging the scheduled transmissions with the serving BS according to the schedule.

26. The apparatus of claim 25, wherein the means for receiving the schedule comprises means for receiving a grant message identifying one or more subframes for the scheduled transmissions, wherein the grant message has a second periodicity determined based, at least in part, on the partitioning information.

27. The apparatus of claim 25, wherein the partitioning information further includes information that identifies one or more subframes that are not usable by the MS.

28. The apparatus of claim 27, wherein the means for receiving the schedule comprises means for receiving a grant message, wherein the grant message comprises an offset from a subframe corresponding to a grant opportunity, wherein the offset indicates a subframe for use if the subframe corresponding to the grant opportunity is unknown or not usable by the MS.

29. An apparatus for wireless communications, comprising:
- a memory; and
- at least one processor coupled to the memory, and configured to:
  - receive a schedule for scheduled transmissions, wherein the schedule is determined based, at least in part, on partitioning information having a first periodicity, wherein the partitioning information includes at least information that identifies subframes that are usable by a mobile station (MS) and protected due to cooperative partitioning of resources between a serving base station (BS) and one or more non-serving BSs; and
  - exchange the scheduled transmissions with the serving BS according to the schedule.

30. The apparatus of claim 29, wherein the at least one processor configured to receive the schedule comprises the at least one processor configured to receive a grant message identifying one or more subframes for the scheduled transmissions, wherein the grant message has a second periodicity determined based, at least in part, on the partitioning information.

31. The apparatus of claim 29, wherein the partitioning information further includes information that identifies one or more subframes that are not usable by the MS.

32. The apparatus of claim 31, wherein the at least one processor configured to receive the schedule for scheduled transmissions comprises the at least one processor configured to receive a grant message, wherein the grant message comprises an offset from a subframe corresponding to a grant opportunity, wherein the offset indicates a subframe for use if the subframe corresponding to the grant opportunity is unknown or not usable by the MS.

33. A computer-program product stored on a non-transitory computer-readable medium and comprising code to be executed by a processor for:
receiving a schedule for scheduled transmissions, wherein the schedule is determined based, at least in part, on partitioning information having a first periodicity, wherein the partitioning information includes at least information that identifies subframes that are usable by a mobile station (MS) and protected due to cooperative partitioning of resources between a serving base station (BS) and one or more non-serving BSs; and
exchanging the scheduled transmissions with the serving BS according to the schedule.

34. The computer-program product of claim 33, wherein the receiving the schedule comprises receiving a grant message identifying one or more subframes for scheduled transmissions, wherein the grant message has a second periodicity determined based, at least in part, on the partitioning information.

35. The apparatus of claim 33, wherein the partitioning information further includes information that identifies one or more subframes that are not usable by the MS.

36. The apparatus of claim 35, wherein the receiving the schedule comprises co receiving a grant message, wherein the grant message comprises an offset from a subframe corresponding to a grant opportunity, wherein the offset indicates a subframe for use if the subframe corresponding to the grant opportunity is unknown or not usable by the MS.

37. A method for wireless communications, comprising:
scheduling a mobile station (MS) for transmissions on one or more subframes; and
determining partitioning information that includes at least information that identifies the one or more subframes that are usable by the MS and protected due to cooperative partitioning of resources between a serving base station (BS) and one or more non-serving BSs, wherein the partitioning information is determined based, at least in part, on the scheduling.

38. An apparatus for wireless communications, comprising:
means for scheduling a mobile station (MS) for transmissions on one or more subframes; and
means for determining partitioning information that includes at least information that identifies the one or more subframes that are usable by the MS and protected due to cooperative partitioning of resources between a serving base station (BS) and one or more non-serving BSs, wherein the partitioning information is determined based, at least in part, on the scheduling.

39. An apparatus for wireless communications, comprising:
a memory; and
at least one processor coupled to the memory, and configured to:
schedule a mobile station (MS) for transmissions on one or more subframes; and
determine partitioning information that includes at least information that identifies the one or more subframes that are usable by the MS and protected due to cooperative partitioning of resources between a serving base station (BS) and one or more non-serving BSs, wherein the partitioning information is determined based, at least in part, on the schedule.

40. A computer-program product stored on a non-transitory computer-readable medium and comprising code to be executed by a processor for:
scheduling a mobile station (MS) for transmissions on one or more subframes; and
determining partitioning information that includes at least information that identifies the one or more subframes that are usable by the MS and protected due to cooperative partitioning of resources between a serving base station (BS) and one or more non-serving BSs, wherein the partitioning information is determined based, at least in part, on the scheduling.

* * * * *